United States Patent
Zhao et al.

(10) Patent No.: US 8,284,329 B2
(45) Date of Patent: Oct. 9, 2012

(54) ELECTRONIC DEVICE ASSEMBLY AND PROTECTIVE APPARATUS THEREOF

(75) Inventors: Er-Zheng Zhao, Shenzhen (CN); Tay-Yang Lin, Taipei Hsien (TW); Hong-Wei Zhu, Shenzhen (CN); Hai-Yang Yu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 572 days.

(21) Appl. No.: 12/551,426

(22) Filed: Aug. 31, 2009
(Under 37 CFR 1.47)

(65) Prior Publication Data
US 2010/0133964 A1 Jun. 3, 2010

(30) Foreign Application Priority Data
Dec. 1, 2008 (CN) .......................... 2008 1 0305886

(51) Int. Cl.
*H04N 5/64* (2006.01)
(52) U.S. Cl. ....................................................... 348/838
(58) Field of Classification Search .......... 348/836–843;
*H04N 5/64*
See application file for complete search history.

(56) References Cited

U.S. PATENT DOCUMENTS

| | | | | |
|---|---|---|---|---|
| 6,078,495 | A | * | 6/2000 | Cipolla et al. ........... 361/679.46 |
| 7,567,436 | B2 | * | 7/2009 | Jeong ....................... 361/679.22 |
| 2002/0051098 | A1 | * | 5/2002 | Morita et al. ................. 348/836 |
| 2009/0225239 | A1 | * | 9/2009 | Osada et al. .................. 348/841 |

* cited by examiner

*Primary Examiner* — David Czekaj
*Assistant Examiner* — Tracy Li
(74) *Attorney, Agent, or Firm* — Altis Law Group, Inc.

(57) ABSTRACT

An electronic device assembly includes a protective apparatus, a first electronic member, and a pivotal mechanism. The protective apparatus includes an upper housing and a lower housing. The first electronic member is housing in the upper housing. The pivotal mechanism received in the lower housing rotates the upper housing relative to the lower housing. When the upper housing is unlatched by the pivotal mechanism from the lower housing, the first electronic member leaves the protective apparatus, and when the upper housing is driven by the pivotal mechanism to latch to the lower housing, the first electronic member is shielded in the protective apparatus.

13 Claims, 4 Drawing Sheets

ELECTRONIC DEVICE ASSEMBLY AND PROTECTIVE APPARATUS THEREOF

BACKGROUND

1. Technical Field

The disclosure generally relates to electronic device assemblies, and particularly to an electronic device assembly having a protective apparatus.

2. Description of Related Art

Portable electronic devices, such as digital photo frames, often feature protective apparatuses to avoid damage, especially during travel. However, the devices must be removed or separated from the protective apparatus, which must then be stored, this is an inconvenience. Therefore, what is needed is a protective apparatus to solve the limitations described above.

BRIEF DESCRIPTION OF THE DRAWINGS

The components of the drawings are not necessarily drawn to scale, the emphasis instead being placed upon clearly illustrating the principles of the embodiments of an electronic device assembly. Moreover, in the drawings, like reference numerals designate corresponding parts throughout several views.

DETAILED DESCRIPTION

Figure 1:
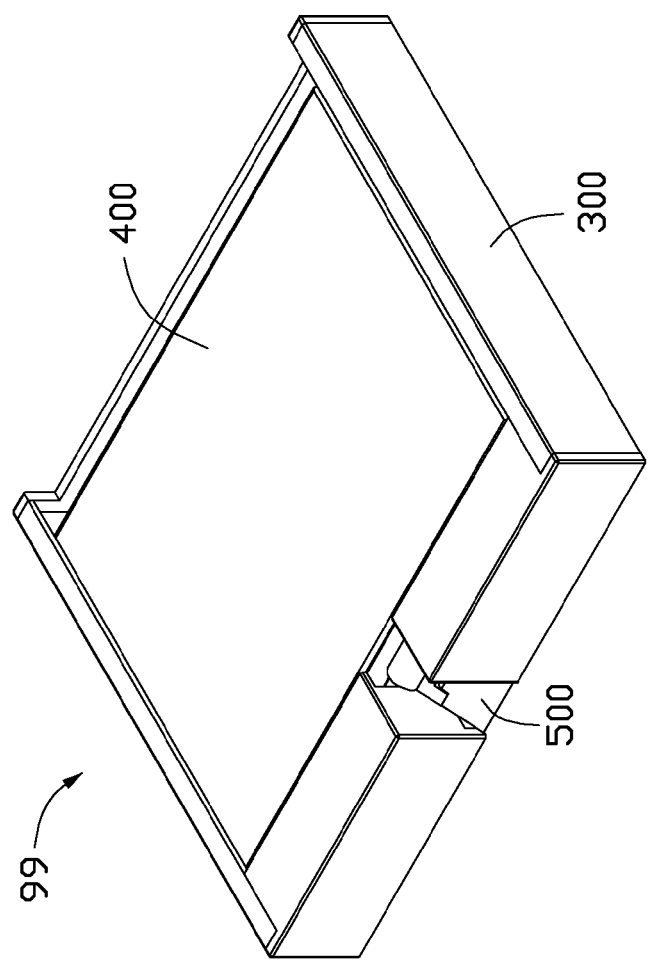
FIG. 1 is a perspective view of a closed state of an electronic device assembly according to an embodiment.
Figure 2:
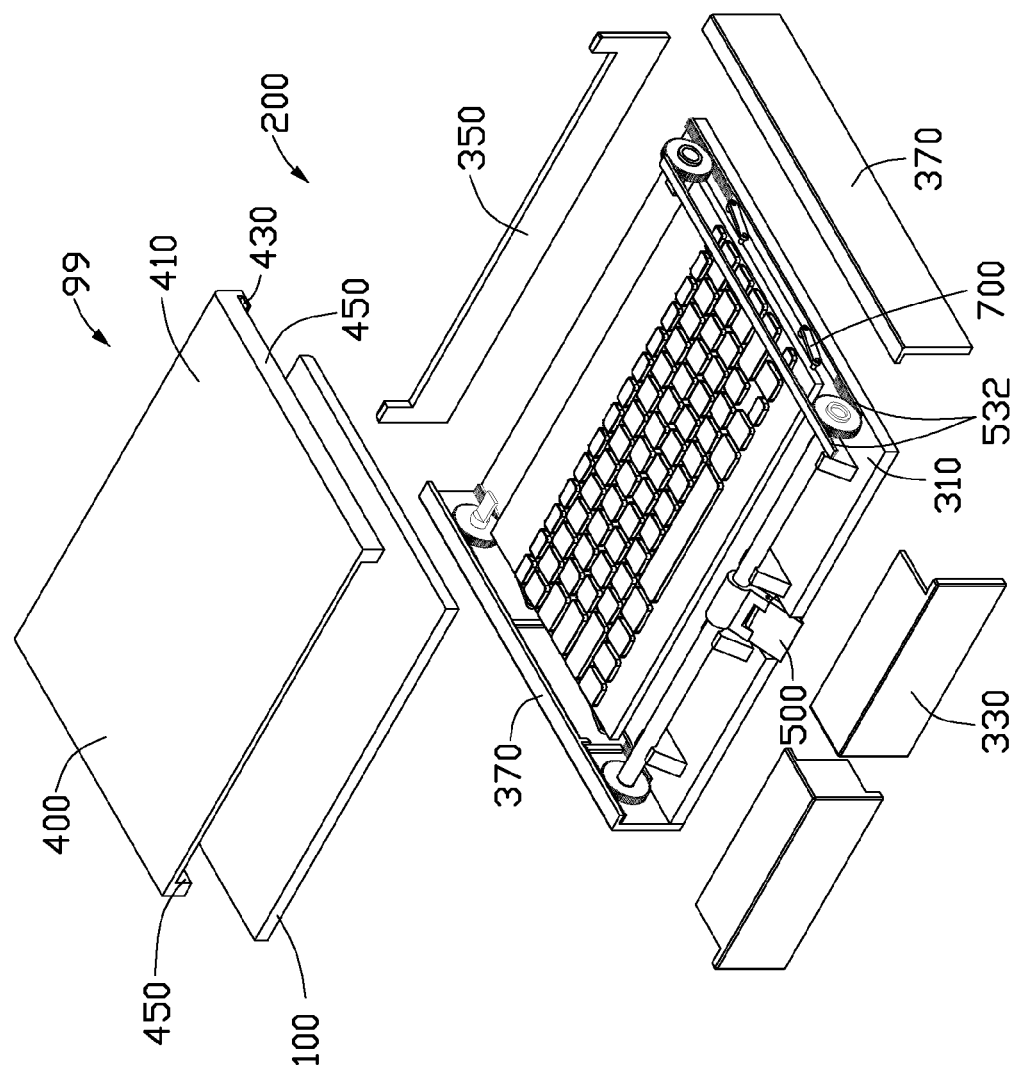
FIG. 2 is a partially exploded view of the electronic device assembly of FIG. 1.
Figure 3:
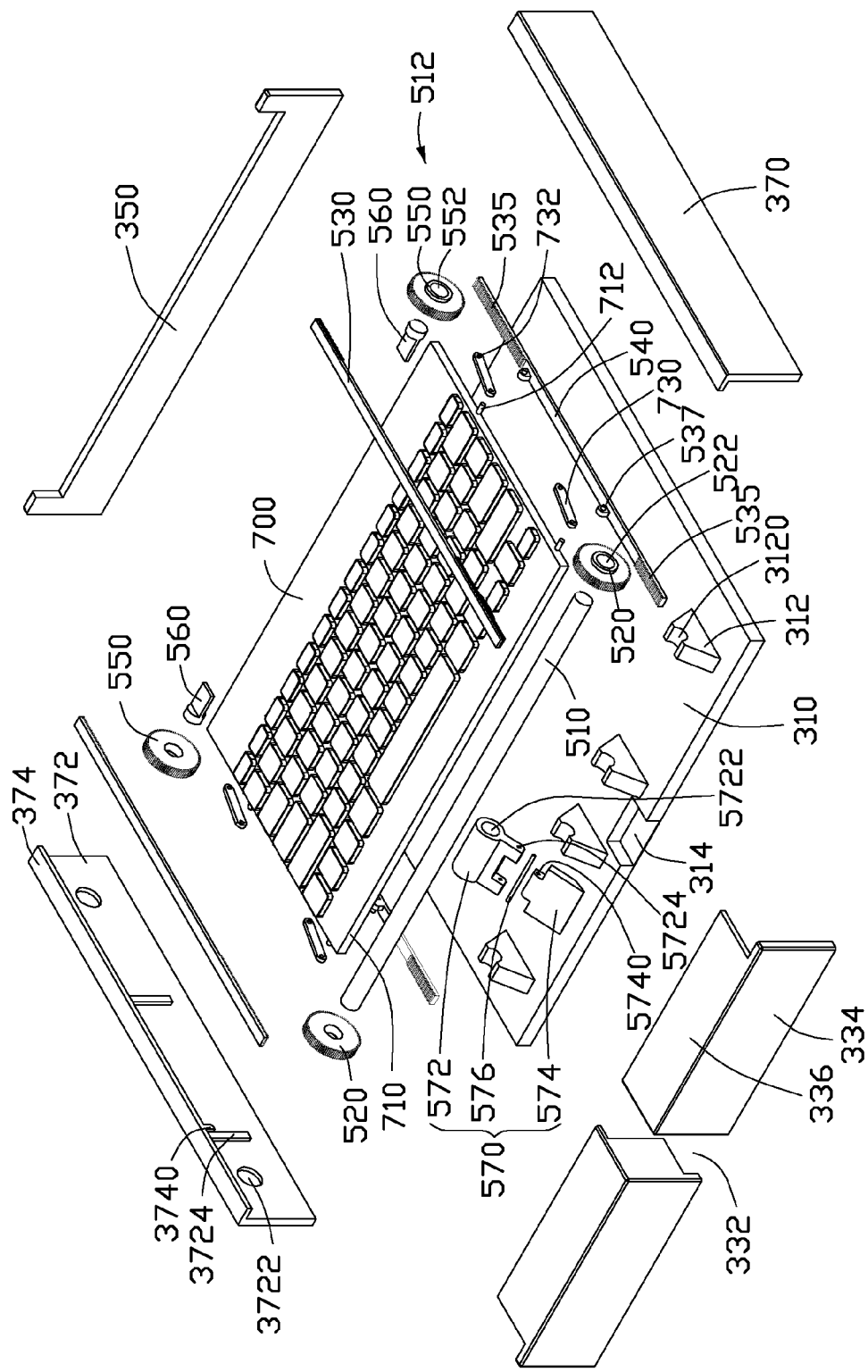
FIG. 3 is an exploded view of the electronic device assembly of FIG. 1.

Referring to FIGS. 1 to 3, an electronic device assembly 99 includes a first electronic member 100, a protective apparatus 200, and a second electronic member 700. The first electronic member 100 may be a digital photo frame utilizing a display module. The second electronic member 700 may be a keyboard device electrically coupled to the first electronic member 100 for receiving user input. The first electronic member 100 is received in the protective apparatus 200 and adjustable thereby. The second electronic member 700 is housed in the protective apparatus 200 and is elevateable and lowerable by the protective apparatus 200.

The protective apparatus 200 includes a lower housing 300, an upper housing 400, and a pivotal mechanism 500. The upper housing 400 is rotatably coupled to the lower housing 300 via the pivotal mechanism 500. The upper housing 400 thus covers the lower housing 300 when closed, and rotatable away from the lower housing 300 when open. The first electronic member 100 is received in the upper housing 400. The second electronic member 700 is housed in the lower housing 300. When the upper housing 400 is closed, the first electronic member 100 is housed in the protective apparatus 200. When the upper housing 400 is open, a portion of the first electronic member 100 is exposed.

The lower housing 300 includes a base 310, a front wall 330, a rear wall 350, and two sidewalls 370. The front wall 330, the rear wall 350, and the two sidewalls 370 extend upwardly and perpendicular to edges of the base 310. The front wall 330 is parallel to the rear wall 350, and the two sidewalls 370 are substantially perpendicular to the front wall 330 and the rear wall 350.

Four supporting members 312 are disposed symmetrically on the base 310 adjacent to the front wall 330. A semicircular recess 3120 is defined in each supporting member 312. The four recesses 3120 are arranged in a line. A rectangular notch 314 is defined at the middle of an edge of the base 310 adjacent to the front wall 330.

The front wall 330 includes a front board 334, and a protruding board 336 extending perpendicular to the top of the front board 324. The protruding board 336 is opposite to the base 310. An opening 332 is defined in the front wall 330 and divides the front wall 330 into two parts. The opening 332 is disposed corresponding to the notch 314.

Each sidewall 370 includes a first board 372, and a second board 374 extending perpendicular to the top of the first board 372. The second board 374 is opposite to the base 310. Two holes 3722 are defined in an internal surface of the first board 372. Two strip stoppers 3724 perpendicular to the second board 374 are disposed between the two holes 3722. The two stoppers 3724 limit sliding of the pivotal mechanism 500. A limiting member 3740 extends downwardly from the second board 374. The limiting member 3740 is opposite to the base 310 away from the first board 372.

The upper housing 400 includes a main board 410, a rear board 430, and opposite side boards 450. The rear board 430 and the side boards 450 extend downwardly from edges of the main board 410. The rear board 430 is adjacent to the rear wall 350. The two side boards 450 are adjacent to the rear board 430. The main board 410, the rear board 430, and the side boards 450 form a receiving space (not labeled) for the first electronic member 100.

The pivotal mechanism 500, housed in the lower housing 300, includes a pivot shaft 510, two transmission apparatuses 512, and a handle 570. The pivot shaft 510 is rotatably mounted in the recesses 3120. The two transmission apparatuses 512 are attached to the pivot shaft 510. The handle 570 is fixed to the pivot shaft 510.

Each transmission apparatus 512 includes a driving portion 520, a transmission member 532, and a driven portion 550. The driving portion 520 is fastened on the pivot shaft 510 to rotate together with the pivot shaft 510. The transmission member 532 engages and moves the driving portion 520 back and forth. The driven portion 540 engages and rotates the transmission member 532.

In the embodiment, the driving portion 520 and the driven portion 550 are gears. A first shaft hole 522 is defined in a center of the driving portion 520. A second shaft hole 552 is defined in a center of the driven portion 550. The transmission member 532 includes a first transmission portion 530 and a second transmission portion 540. The first transmission portion 530 and the second transmission portion 540 may be two strips, and are parallel. The driving portion 520 and the driven portion 550 are sandwiched between the first transmission portion 530 and the second transmission portion 540. Each end of the first transmission portion 530 and that of the second transmission portion 540 include a toothed portion 535. The first transmission portion 530 and the second transmission portion 540 engage the driving portion 520 and the driven portion 550 via the toothed portions 535.

The transmission apparatus 512 further includes a connection rod 560 for connecting with the upper housing 400. The second transmission portion 540 includes two bearings 537. The two bearings 537 are opposite to the first transmission portion 530. The connection rod 560 is fastened to the driven portion 550 by extending through the second shaft hole 552.

The handle 570, fastened to the pivot shaft 510, includes a fixing member 572, an operating member 574, and a pivot rod 576. The fixing member 572 includes a sleeve 5722. A first through hole 5724 is defined in the fixing member 572. A second through hole 5740 is defined in the operating member 574. The operating member 574 is rotatably coupled to the fixing member 572 by the pivot rod 576 extending through the first through hole 5724 and the second through hole 5740. The handle 570 is fixed to the pivot shaft 510 via the sleeve 5722.

The second electronic member 700 includes a main body 710, and four connection shafts 730. Two columnar protrusions 712 extend from each side of the main body 710. Two round holes 732 are defined at opposite ends of each connection shaft 730.

During assembly, the second electronic member 700 is movably coupled to the second transmission portion 540 by the four connection shafts 730 engaging the columnar protrusions 712 and the bearings 537. Each first transmission portion 530 is limited by the limiting members 3740 and the first board 372, so that the first transmission portions 530 can move back and forth parallel to the first board 372. The handle 570 is fixed to the pivot shaft 510 corresponding to the notch 314, and exposed via the opening 332 of the front wall 330.

The pivot shaft 510 passes through the first shaft holes 522 and is rotatably received in the opposite holes 3722 of the sidewalls 370, so that the two driving portions 520 are fixed symmetrically to the pivot shaft 510 opposite to each other. Each connection rod 560 passes through the second shaft hole 552, so that the driven portions 550 are fastened to the connection rods 560. The connection rods 560 are further slidably received in the other holes 3722, so that the connection rods 550 together with the driven portions 550 are rotatable relative to the holes 3722. The two connection rods 560 are further attached to the rear board 430.

After assembly, the pivot shaft 510 rotatably received in the holes 3722 is rotatable relative to the supporting member 312. The second electronic member 710 is housed in the lower housing 300 and is elevateable and lowerable via the pivotal mechanism 500. The pivot mechanism 500 is movably received in the lower housing 300. The upper housing 400 receiving the first electronic member 100 is rotatable relative to the lower housing 300. When the upper housing 400 is driven by the pivot mechanism 500 to latch to the lower housing 300, the electronic device assembly 99 is closed. When the upper housing 400 is driven to unlatch from the lower housing 300, the electronic device assembly 99 is open.

Referring to FIG. 1, the electronic device assembly 99 is closed. In the closed state, the upper housing 400 receiving the first electronic member 100 is latching to the lower housing 300, and the second electronic member 700 is pulled down adjacent to the base 310.

Figure 4:
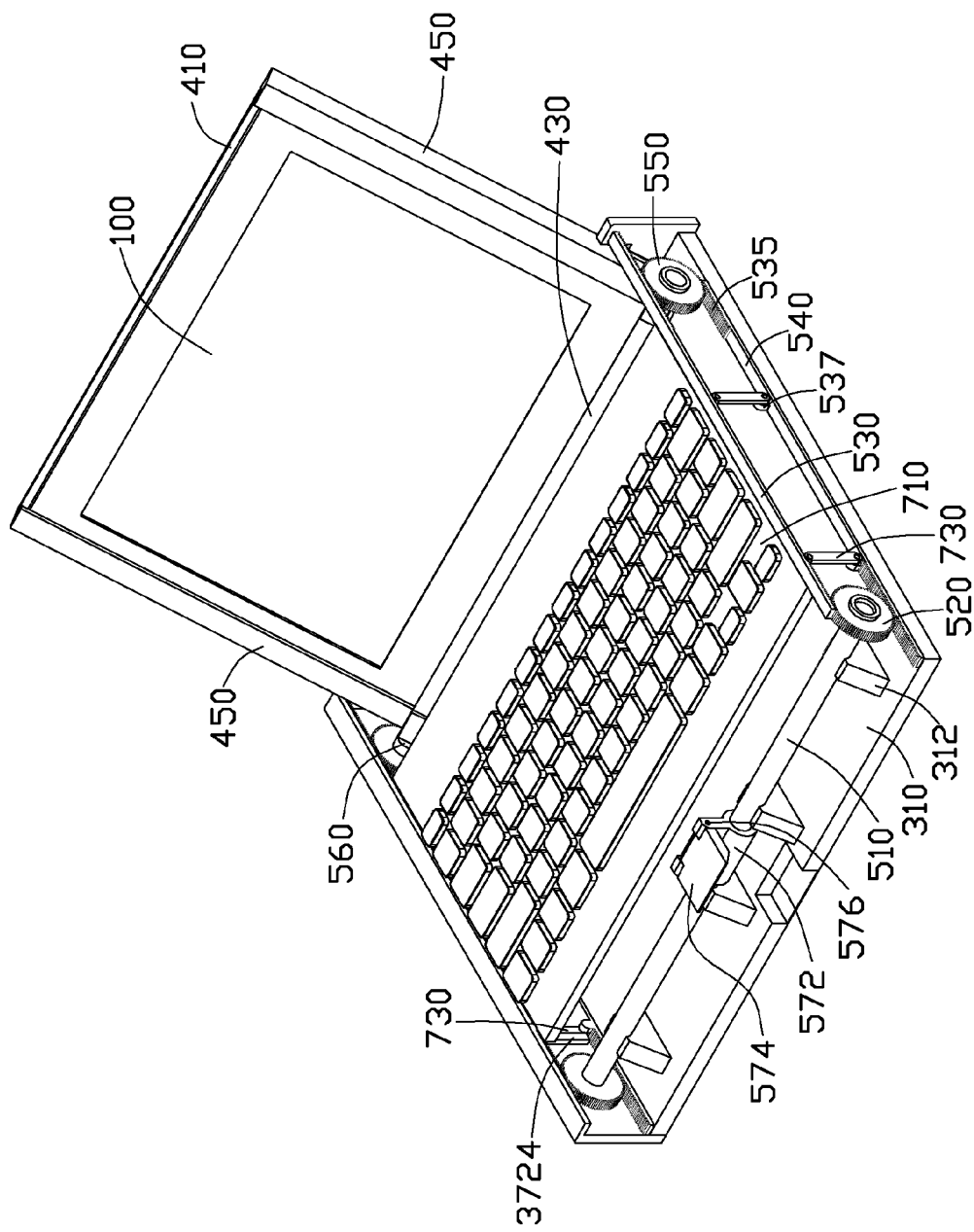
FIG. 4 is a perspective view of the electronic device assembly of FIG. 1 in an open state.

Referring to FIG. 4, when the electronic device assembly 99 is to be opened, the handle 570 is rotated away from the base 310 till the four connection shafts 730 are stopped by the stoppers 3724. The handle 570 drives the pivot shaft 510 and the two driving portions 520 to rotate clockwise relative to the supporting portion 312. As the first transmission portions 530 and the second transmission portions 540 are threaded with the driving portions 520 and the driven portions 550, the first transmission portions 530 are moved toward the rear wall 350, and the second transmission portions 540 are moved backward toward the rear wall 350. As a result, the upper housing 400 is unlatched from the lower housing 300, and the connection shafts 730 extend to elevate the second electronic member 700. When open, the first electronic member 100 is supported by the protective apparatus 200.

When the electronic device assembly 99 is to be closed, the handle 570 is rotated toward the base 310. The pivot shaft 510 and the driving portion 520 rotate counterclockwise relative to the supporting member 312, and the second transmission portions 540 are moved toward the rear wall 350. As a result, the connection shafts 730 are pulled down to the lower second electronic member 700, and the upper housing 400 is driven by the driven portions 550 to latch to the lower housing 300. When closed, the first electronic member 100 received in the upper housing 400 is protected by the protective apparatus 200.

Thus, the upper housing can be latched to and unlatched from the lower housing 300 by rotation of the handle 570 counterclockwise and clockwise.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A protective apparatus, comprising:
   a lower housing;
   an upper housing; and
   a pivotal mechanism received in the lower housing;
   wherein the upper housing being capable of assuming a position covering the lower housing via the pivotal mechanism;
   wherein the pivotal mechanism comprises a pivot shaft and two transmission apparatuses attached thereto, each transmission apparatus comprises a driving member, a transmission member, and a driven member, the pivot shaft is rotatably connected to the lower housing, the driving member is fixed on the pivot shaft to rotate with the pivot shaft, the driven member is rotatably fixed to the lower housing and fixed to the upper housing, and the transmission member engages and moves with the driving member to drive the driven member to rotate accordingly and thus bring the upper housing to rotate in relative to the lower housing.

2. The protective apparatus of claim 1, wherein the pivotal mechanism further comprises a handle fastened on the pivot shaft between the two transmission apparatuses.

3. The protective apparatus of claim 1, wherein at least one supporting member is attached to a bottom surface of the lower housing, and the pivot shaft is rotatably mounted to the at least one supporting member.

4. The protective apparatus of claim 3, wherein each transmission apparatus further comprises at least one connection shaft, via which the second electronic member is movably coupled to the second transmission portion.

5. The protective apparatus of claim 1, wherein each transmission member comprises a first transmission portion and a second transmission portion, the driving member and the driven member engaging and being sandwiched between the first transmission portion and the second transmission portion.

6. The protective apparatus of claim 5, wherein each transmission apparatus further comprises a connection rod engaging the driven member and fixed to the upper housing.

7. The protective apparatus of claim 6, wherein the connection rod is further pivotally coupled to the lower housing.

8. An electronic device assembly, comprising:
   a first electronic member;
   a second electronic member; and
   a protective apparatus housing the first electronic member and the second electronic member, comprising a lower housing, a pivotal mechanism received in the lower housing, and an upper housing capable of assuming a position covering the lower housing via the pivotal mechanism;

wherein the pivotal mechanism comprises a pivot shaft and two transmission apparatuses attached to the pivot shaft;

wherein each transmission apparatus comprises a driving member, a transmission member, and a driven member, the driving member fastened on the pivot shaft to rotate with the pivot shaft, the driven member is rotatably fixed to the lower housing and fixed to the upper housing, the transmission member engages and moves with the driving member to drive the driven member to rotate accordingly and thus bring the upper housing to rotate in relative to the lower housing.

9. The electronic device assembly of claim 8, wherein the pivotal mechanism further comprises a handle, fastened on the pivot shaft between the two transmission apparatuses.

10. The electronic device assembly of claim 8, wherein each transmission member comprises a first transmission portion and a second transmission portion, and the driving member and the driven member engage and are sandwiched between the first transmission portion and the second transmission portion.

11. The electronic device assembly of claim 10, wherein each transmission apparatus further comprises a connection rod engaging the driven member and fixed to the upper housing.

12. The electronic device assembly of claim 10, wherein the connection rod is further pivotally coupled to the lower housing.

13. The electronic device assembly of claim 10, wherein each transmission apparatus further includes at least one connection shaft, via which the second electronic member is movably coupled to the second transmission portion.

* * * * *